June 20, 1967  S. HAMILTON ETAL  3,327,312
MULTI-CHANNEL THERMAL RECORDER
Filed Dec. 22, 1964  2 Sheets-Sheet 2

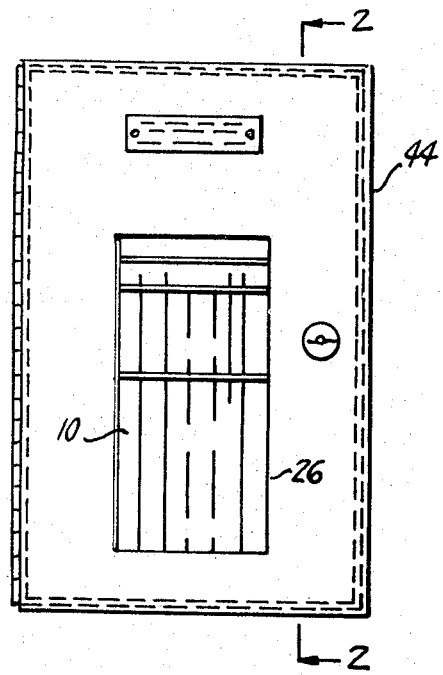
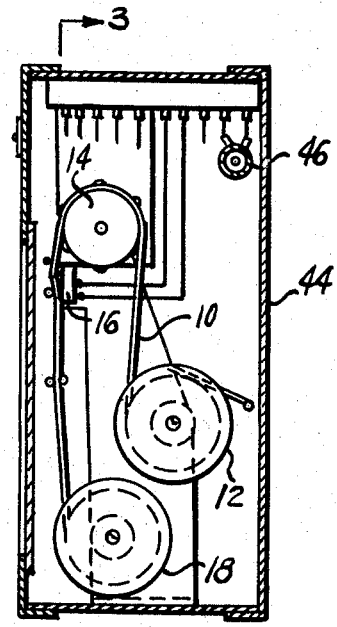
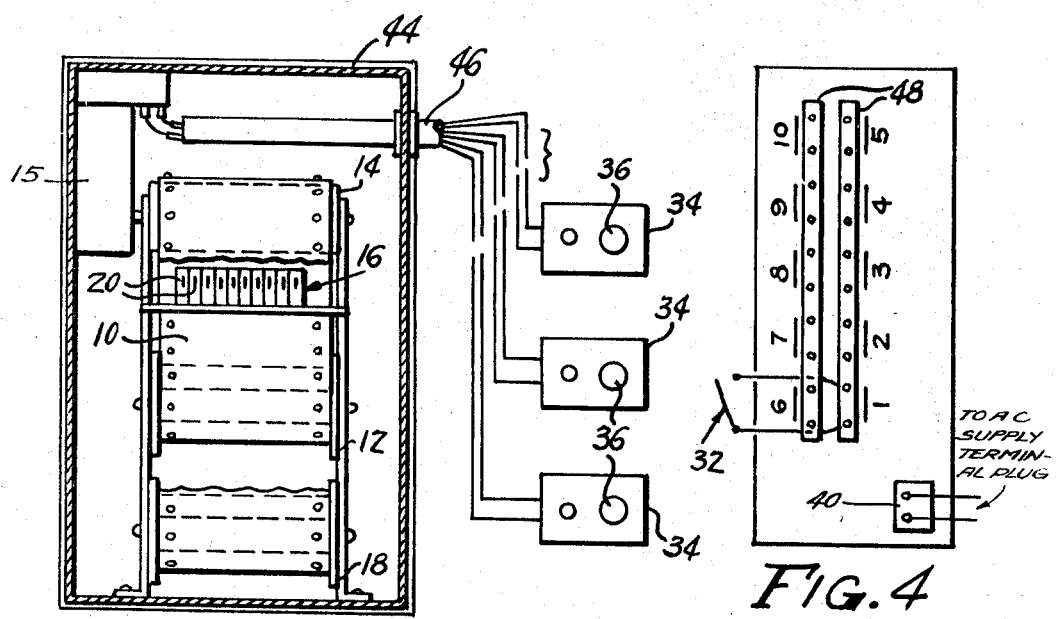
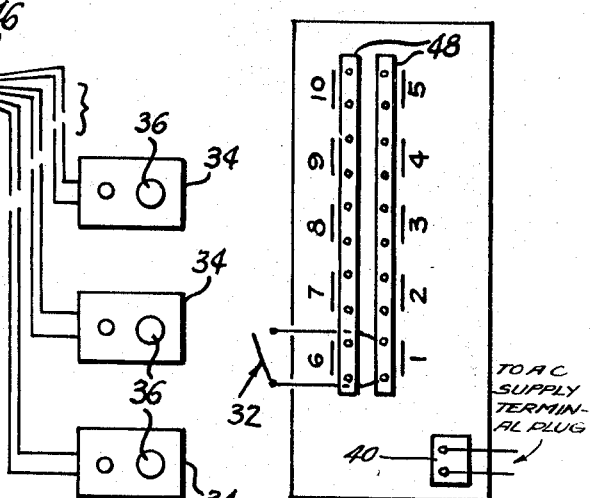

INVENTORS
Sam Hamilton
BY Roland R. Clayton,
by
their ATTORNEYS

United States Patent Office 3,327,312
Patented June 20, 1967

3,327,312
MULTI-CHANNEL THERMAL RECORDER
Sam Hamilton, Ardmore, and Roland A. Clayton, Philadelphia, Pa., assignors to The Electric Tachometer Corporation, Philadelphia, Pa., a corporation of Delaware
Filed Dec. 22, 1964, Ser. No. 420,399
3 Claims. (Cl. 346—49)

This application is a continuation-in-part of our patent application Ser. No. 163,632 filed Jan. 2, 1962.

This invention relates to recorder chart systems and to the art of recording, and more particularly is concerned with the provision of improved apparatus for the production of permanent records (charts) of operation data such for example as rates of speed, rates of production, operating times, "down time" of machines, and the like, without the use of an inking or marking stylus.

Various recording instruments have been used for recording operation time, speed, temperature, and the timing of various events with respect to the operation of one or more machines indicating the causes of the respective events, etc. Many of these recording instruments use a chart in strip form, which chart is moved at a constant speed axially under a stylus or scriber, the stylus being brought in contact with the chart and moved there across in accordance with the changing value of the operation characteristic being measured and recorded on the chart to produce a time curve of the operation characteristic.

In production machines, it is generally of interest to management to have a running record of operation time, shut down time and the reasons for or causes of each shut down; in some cases, the time of slow-downs and their causes might be desirable information, where full speed operation with minimum number of necessary delays for servicing and repairs and elimination of over or underruns is the result sought.

An object of the present invention is to provide a recording apparatus which is not affected by vibration or by normal changes in line voltage or by relative distance between the recording instrument and the machine or machines undergoing observation.

A particular object of the present invention is to provide a simple recording instrument, using a series of stationary horizontally spaced marked devices which will form parallel vertical lines on a record strip moving vertically at a constant rate, to produce a chart indicating the duration or happening of a corresponding series of events which control the operation of the several marking devices, respectively.

A further object is to provide a record strip of paper having a dark color with a light colored wax coating on its face, and to orient a stationary marking device or a plurality of stationary marking devices in contact with the back of said strip, each of said devices being an independent electrically heated contact element for operation by a switch controlled in response to the happening of some operating event of a machine, such as running at full speed or at different ranges of speeds or the operation of code switches, either by the operator or automatically, to indicate what happened or what caused a shut-down or slow-down and the corresponding times of these events.

A further object is to provide an efficient and reliable marking means for use on record charts of the wax coated type, by maintaining the marking element in contact with the uncoated side of the chart, and heating said element only when a trace of the contact is desired to be recorded during a timed relative movement between said chart and said element, no record of said trace being produced when the element is not heated.

A further object is to provide a record-producing heated marking element at the back of a chart, so as to expose the front of the chart for unobstructed observation of the record while it is being made.

A further object is to provide a chart recording device of such simple design that it incorporates no moving parts other than a timing motor and associated parts that are required to advance the chart at a constant rate.

A further object is to provide a recording device that utilizes a combination of heat sensitive chart paper and heating elements of such nature that the chart marking can be accomplished at relatively low temperatures and, therefore, there is no danger of fire, little possibility of ever "burning out" a heating element, and no need for safety devices, such as thermal "cutouts" or timing relays.

A further object is to provide a chart recording instrument that is virtually silent in operation.

Another object is to provide an electrically operated chart marking system in which, although each marking element is stationary, the width of the vertical trace formed can be varied by increasing or decreasing resistance in the electrical heating circuit. Thus, for example, a single heating element can, by the use of proper switches and resistors, cause a wide trace on the chart when a machine runs at high speed and a narrow trace when it runs at low speed.

These and other inventive objects are realized by the hereinafter-described apparatus.

In generic aspect, the apparatus of the present invention comprises a coated chart (hereinafter to be described in greater particularity); motor means for driving the chart at constant speed; one or more relatively small, stationary, heating elements or "styli"; and means for energizing the heating elements to raise the temperature of the same to above wax-melting temperature, said heating elements being horizontally disposed in the path of said chart so as to be in continuous, linear engagement with a surface of said chart.

The coated chart comprises a sheet of paper having a dark color (e.g. dark blue) and, on the front surface of the sheet a coating layer of a heat-sensitive normally opaque material having a color contrasting with that of the dark colored sheet, e.g. a wax-containing white or light colored coating which coating layer preferably is disposed on that side of the chart which is intended to be exposed to view. Each stationary heating element is disposed "behind" the chart; that is to say, in contact with that side of the chart which is opposite to the coated side thereof. The coating layer preferably comprises a wax which, when the contacting heating element is energized, is melted and exposes a "dot" or a "streak" of the underlying contrastingly colored sheet depending on how long the heating element is energized and how fast the chart is driven.

Contrary to such conventional "inkless" recording systems of which we are aware, while each stationary heating element is continuously in contact with the chart, a mark (i.e., a "dot" or "streak") is caused to appear only when the heating element is energized, and the and the marking ceases upon de-energization of the heating element.

The invention will now be more specifically disclosed with reference to the following detailed description of a preferred form of the invention as illustrated in the accompanying drawings, wherein:

FIG. 1 is a front elevational view of a precision recorder using the novel recording means of the present invention;

FIG. 2 is a sectional view of the recorder taken on line 2—2 of FIG. 1;

FIG. 3 is a sectional view taken on the line 3—3 of FIG. 2 and showing three remote control code switches connected to three of ten stylus heaters to produce coded records on the corresponding channels of the chart;

FIG. 4 is a diagrammatic view of the terminal arrangement of the heater connections to external remote switches and a terminal plug connection for electric power supply;

Figure 5:
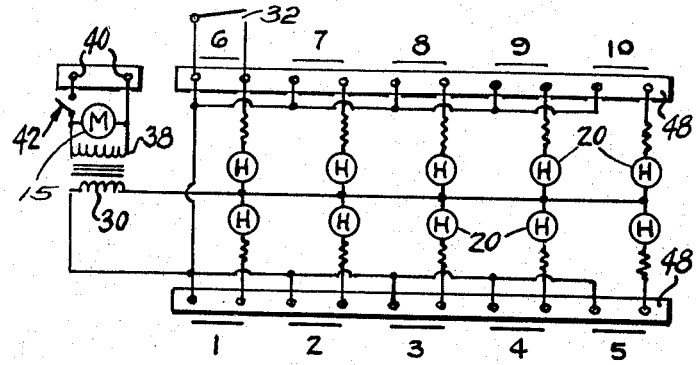
FIG. 5 shows the wiring diagram for the clock motor, transformer and heater elements.

In the illustrated embodiment of the present invention, a record chart strip 10 is supplied from a roll 12 over sprocket roll 14, said sprocket roll being driven at a synchronous speed by a clock ("timing") motor 15. Sprocket roll 14 drives the chart strip over the marking element assembly 16 whence it is guided to and received by the take-up roll 18, the take-up being accomplished by a slippage spring belt that is connected to the sprocket roll 14 and take up roll 18. The strip is ruled for ten channels.

The chart strip is of paper of a dark color and has an opaque light colored wax coating on its front surface so that, whenever any of the heaters 20 is energized, the wax coating is melted at the point opposite the contact of the heater with the back of the strip 10. The melted wax is immediately absorbed by the paper and exposes a dark point on the front of the strip. As long as this heater is energized it will thus melt successive points along the contact path to product a dark line forming the record trace, equivalent to a line scribed in any other manner. In this case, however, the marking means is at the back of the paper strip and does not obstruct the view of the recordings or lines 24 already made, to indicate which machines are operating or have been operating within the past time intervals still exposed within the viewing frame of the window 26, or what other coded signals 28 have been recorded in those intervals.

As shown in FIG. 5, one heater element 20 and a fixed resistor in series with same is provided for each of the ten recording channels. The heater elements receive their power from, and are connected in parallel branches to, coil 30 which is the low voltage side of a step-down transformer. In this way, all of the heater elements are operated on low voltage and independent of one another. To complete a given heater element circuit and thereby cause a mark to appear on the chart, all that is required is an external switch, such as 32, which could be connected to any one of the ten pairs of terminals. When the switch is closed, the low melting point of the wax on the chart and the "burst" of heat energy at the heating element cause a mark to appear on the chart quite rapidly. The sudden flow of heat energy is a result of the small mass of the thermistor-type element which has a negative temperature coefficient, an inherent characteristic whereby its resistance decreases as it reaches operating temperature. Since it is in series with a fixed resistor, the net effect is that, after the initial flow of heat energy, the heat (or wattage) of the element is reduced.

The transformer coil 38 is connected in parallel with a clock motor 15 to power supply terminals 40 through a control switch 42 which may be located on the instrument casing 44, and the terminals 40 may be connected by a cable to a power source in any convenient manner. Switch 42 is a convenience on-off switch which enables the user of the instrument to completely shut it off when desired (e.g. during night hours). The external switches, whether automatic or manually operated, are all connected into the corresponding heater branches through a cable 46 passed into the casing 44, the wire terminals being connected to the corresponding pairs of terminals on the blocks 48 indicated by the numerals corresponding to the channels on the record strip with which they cooperate to energize the proper stylus heaters whenever the corresponding switches are operated.

In most applications of this recording equipment the recording instrument is mounted at a location remote from the machine or process whose operation is to be recorded. The switch 32, however, is located at the machine or process and is usually arranged so that it is actuated "automatically" by same. The switch may take many forms, since any contact making device will fulfill the function. Typical examples are: a photo-electric switch used to "pick-up" assembly line operations; an electric relay connected to a machine motor; a distributor-type contactor driven from a rotation shaft; a mechanical "limit switch" installed on a door to a room or on the ram of a hydraulic or punch press. In all cases, the switch merely opens or closes an existing low voltage heater circuit. When the switch opens and a heater is de-energized the small mass of the heater element enables it to cool to a non-marking ambient temperature virtually instantaneously.

Figure 9:
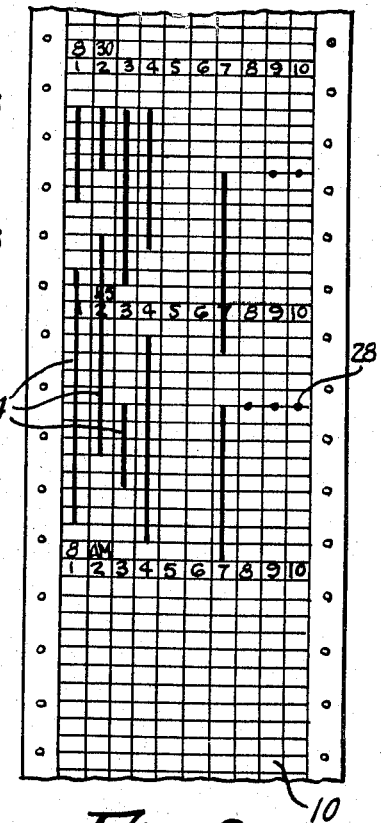
FIG. 9 is a portion of a typical chart strip having ten record channels controlled by as many remote operation/ or code switches.
Figure 6:
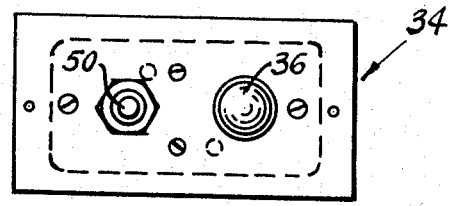
FIG. 6 is a front view of a typical code switch with a signal light.
Figure 7:
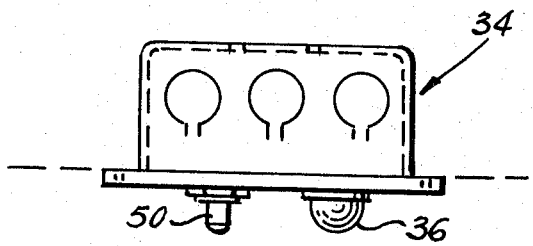
FIG. 7 is a side view thereof.
Figure 8:
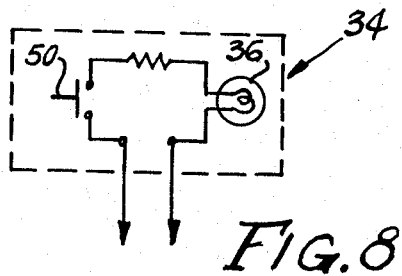
FIG. 8 is a wiring diagram of this code switch circuit.

In addition to information as to operating and idle ("down") time of a machine or process, management is often interested in the reasons for lost time or delays which have an effect on production costs and product quality. Reasons for such delays—and other types of supplementary information—may be placed on the recording chart by means of a "chart coding system." In this system, a series of "dots" or "spots" may be placed on the chart by a machine operator or process supervisor who uses manually operated switches or push buttons that are located convenient to his station. While any type of switch— such as switch 32—could be used, the push button coding switch assembly 34 is particularly useful and convenient. As shown in FIGURES 6, 7 and 8, this assembly includes a push button switch 50, a signal light 36, a series connected resistor, and a housing for the assembly. When the push button switch 50 is depressed a spot appears on the chart and the signal light goes on. Since the recording instrument is usually at a location remote from the switch assembly 34, the light 36 is desirable to assure the operator that the button has been fully depressed, the corresponding heater circuit is energized, and a proper recording is made on the recorder chart strip. If, for example, three switches 34 are used and connected to the circuits for recording channels 8, 9 and 10, as many as seven different combinations of code signals can be recorded to indicate the corresponding seven different events, operations or explanations by a prearranged code, the possible combinations being 8, 9, 10 (8–9), (8–10), (9–10), and (8–9–10). In FIGURE 9, the spots 28 indicate a coding (8–9–10) at 8:09 a.m. and coding (9–10) at 8:23 a.m.

Although a quantity of three push button coding switch assemblies 34 have been used for illustration, it is important to note that any or all of the ten recording channels can be used either for "chart coding" or for the automatic recording of operating and idle time of machines or processes, the specific application of any given channel being entirely at the discretion of the user. Further, the simplicity of the instrument and the unique characteristics of the small heating elements in constant contact with a wax coated chart make possible a virtually endless variety of uses and switching arrangements. A case in point is that what amounts to "automatic chart coding" can often be accomplished. An example of this: channel 1 can be used to record the operation of a rotary newspaper press by connecting a suitable relay in the press drive motor circuit; channel 2 can be used to automatically code a break in the paper web (reason for down time) by merely installing a mechanical limit switch in contact with the web, said switch being arranged so that its contacts close and a mark is made on the chart when a web break occurs. In this way, the web break is recorded on the chart without requiring the press operator to manually operate a push button coding switch assembly.

Another feature of this recording device is that, while it is most commonly used to record machine operating or "down" time, it can, through the use of proper sensing devices, be applied to record a variety of rather specialized functions, such as position, speed, pressure, and temperature. Either linear or rotary position may be recorded by utilizing all of the record channels and letting each channel represent a particular position. As a sensing device it is merely necessary to provide a pair of contacts for each position to be recorded. Typical sensors could be a series of cam operated switches oriented on a rotating shaft or limit switches properly oriented on an object which has linear movement. If employed as a speed recorder, each channel would represent a specific speed and might be actuated by a voltage sensitive relay which is operated from the voltage output of a tachometer generator; or each channel could be actuated by a centrifugal speed sensing switch. Similarly, pressure or temperature recording can be made by using thermal sensing elements, pressure switches or transducers.

Figure 10:
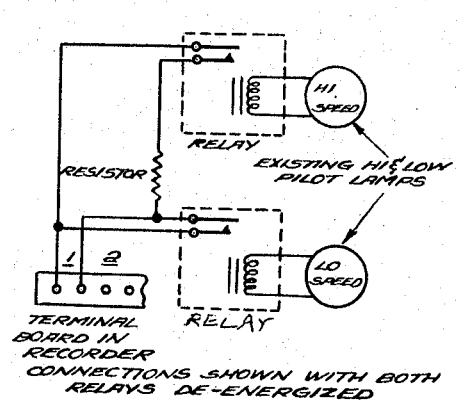
FIG. 10 is a wiring diagram showing application of the system of the present invention to a papermaking machine.

An additional and important feature of this recording device involves the use of a switching arrangement whereby the width of the recording trace formed can be varied to such an appreciable extent that a single recording channel can be used to record two separate functions. That is to say, in channel 1, for example, a trace $\frac{1}{16}''$ wide can be used to indicate a machine running at high speed and a trace $\frac{1}{8}''$ wide to show the same machine running at low speed. While this feature may be used to advantage in many applications, one that is ideally suited is in the paper making process. Many of the paper making machines today are designed with power drives that, rather than run at endless variable speeds, run at high speed, at low speed or "off." The machine operator then has only three control buttons or switches at his disposal (the aforementioned functions) and with the machine are usually supplied red and green pilot lamps to indicate high and low speeds. To apply our first recording channel to these two speed functions, therefore, it is merely necessary to connect a suitable relay to each of the pilot lamps, as shown in FIGURE 10, and install one series resistor. When the machine operates at low speed, the relay connected to the low speed pilot lamp closes the switch contacts, thus energizing the heating element in channel 1 to cause a vertical trace $\frac{1}{8}''$ wide. However, when the machine operates at high speed the second relay operates, causing a different circuit in which the series resistor has been inserted. The closing of the contacts of this relay cause a vertical trace on the chart which is $\frac{1}{16}''$ wide. This feature makes it possible to connect a 10 channel recorder to 10 machines and record, for each of said machines, whether the machine is going at high speed, at low speed, or has stopped. Without this feature, two (2) separate 10 channel recorders would be required. In connection with this, it also should be noted that it is primarily the characteristic of the special wax coated chart that makes this possible. It has "flow characteristics" not available with many other heat or pressure sensitive materials and this makes it possible to get a clean, bold, vertical trace of a width that is actually greater than that of the heating element itself.

The simplicity of this recording device is well realized when one considers the fact that it incorporates no moving parts other than those associated with the synchronous drive of the recording chart strip, and the fact that all ten of the independent heating elements are small in size, low in heat value, and their respective channels can be utilized by the ultimate customer either for "operation recording" or chart coding, at his discretion. As a result of this simplicity, the recorder is not affected by vibration as are more complicated presently known devices that perform similar functions but utilize numerous moving pens or styli and/or such things as solenoids, contact-making relays, potentiometers, rectifiers, etc. In addition, while many recording instruments are affected adversely by fluctuations in line voltage (and often have adjustable compensators such as rheostats built in), the device which has been described herein is not greatly affected by such changes. The reason for this is that, if a line voltage fluctuation occurs, the variable resistance heating element used in series with a fixed resistor automatically limits the heater element wattage change to a considerably lesser amount than the voltage fluctuation which caused it.

Another feature of the device which is a result of the low heat values, low voltage and current, is the fact that the instrument readily lends itself to the use of inexpensive, small wire (#18" bell or annunciator wire). The current and voltage values are so low that this very small connecting wire could be used to connect 10 machines or processes to the recorder—even if all ten were located as much as a mile away. The significance of this lies in the fact that in many recording instrument installations it is common practice to have the recorder on a different floor in a large building, a considerable distance from the process or operation being recorded. When dealing with a multi-channel instrument that might have a total of 20 wires connecting some ten different machines or processes, the distance factor becomes important not only from the standpoint of the actual cost of such wire, but also from the standpoint of the considerable difference in installation cost involved when using a heavier wire.

Additional features of the device are a result of the combination of a wax coated, heat sensitive chart, which is marked at low temperature (approximately 200° F.), and thermistor type element of small mass (approximately 190,000 cubic mils) in series with a fixed resistor. The operating temperatures involved are such that, even if the temperature did not automatically drop after the initial "burst" of heat, there would be no danger of fire or likelihood of a heating element burning out. As a result, there is no need for protective components, such as thermal "cutouts," timing relays, or similar items which might customarily be employed to provide a timed pulse or limit the heat values. We note here that, in instruments where such components are used, the components themselves occasionally fail and represent moving parts which can be affected by vibration or cause some degree of noise during their normal operation. In the present invention, there are no moving parts in the marking device; the only moving parts in the instrument are a timing (clock) motor and associated parts which drive the web of chart paper at a constant speed. Because of this, the recording instrument is a quiet as an electric clock and particularly well suited for industrial applications where a good number of instruments are to be installed in a superintendent's or executive's office.

The present recorder will automatically and continuously record the operating time and down time for improved production control.

Some of the advantages may be listed as follows:

(1) Easily connected to any machine or process.
(2) Records operation of up to 10 machines simultaneously.
(3) Durable, all-electric operation—no pens to fill, no ribbons to change, no styli to replace.
(4) Maintenance-free markings on special waxed charts.
(5) Decidedly low in cost.
(6) Cause of down time can be recorded on chart.

It is easily installed—at the machine or at a remote location it tells at a glance when and how long your machinery is producing or idle. You get an accurate, permanent record minute-by-minute and day-by-day of machine operation. Armed with this convenient, irrefutable record, you can raise many questions—important questions which should be answered because the answers can save you money. For instance, why is an old machine overworked while a new one stands idle? Is #3 machine held up by lack of materials? Late start after lunch? Too much set-up time? These are but typical random questions that you are bound to raise with this recorder. A single operation recorder may be electrically connected to as many as ten machines to simultaneously record the operation of all ten. Operation of each machine is indicated on a special 10-channel waxed chart by bold vertical lines about 1/16 inch wide. Markings for each channel can be seen readily at a distance to quickly tell you which machines are putting in a good day's work.

The chart in FIG. 9 shows the operating time and down time of five machines. Channels 1 through 4 record "ON" and "OFF" periods of four associated machines. Channels 5 and 6 are unused spares. Channel 7 monitors the fifth machine and channels 8, 9 and 10 are used to furnish a coded record that explains reasons for down time on the fifth machine.

From the chart we see that machine number one commenced operation at 8:02 a.m. and continued until 8:17; it then resumed operation at 8:21. Similar information is presented for machines two, three and four. Channel 7 indicates that machine number five stopped at 8:09. The coding in channels 8, 9 and 10 explains that stoppage was for fresh material. At 8:12 the machine was reloaded and production resumed. At 8:23, the machine was shut down because the job was finished, as indicated by the coding in channels 9 and 10.

The above example is typical of many variations in channel selection, operation, and coding that may be chosen to exactly suit individual requirements.

An important and unique feature of this recorder is its simple, virtually troublefree, marking system. There are no messy pens to fill. The chart is a special wax coated type driven at constant speed by a timing motor. Behind the chart are small, stationary heating elements—one for each channel. Energizing one of these elements melts a small portion of wax, thus allowing the dark chart paper to show through. The chart motion forms this melted portion into a vertical line. Safe and foolproof, this unique system positively records interruptions of 15 seconds or longer durations. Heaters operate at conservative values and seldom, if ever, require replacement.

Each of the possible 10 channels in this recorder may be actuated by a wide variety of contact-making devices. While mechanically-operated switches and/or relays are most common, switches operated by temperature, liquid flow, air pressure, light sources, and other may readily be used. Switching circuits need only handle 24 volts AC furnished from a transformer built into the recorder case.

This recorder may easily be mounted and wired by unskilled personnel. Wiring requires only that 115 volts AC be connected to two terminals in the recorder case, with additional pairs of wires from the recorder to appropriate switches or relays on each machine whose operation is to be recorded. Since these wires carry nonhazardous 24 volts AC, inexpensive, 18-gauge bell wire may be used with perfect safety. Terminals are located and clearly marked for easy handling.

We note here that, from the standpoint of convenience, users of recording instruments sometimes prefer a relatively short length of strip chart which will have recorded data for a 12 or 24 hour period, or perhaps a work shift. In the present invention, such a strip may be obtained by the user if, instead of using the take up roll 18, he merely allows the chart to be dropped through a slot provided in the bottom of the instrument housing, so that a given length may be torn off at periodic intervals. In order to keep the chart taut, a clip or weight of some sort is attached to the end of the strip. Another arrangement which does this in a somewhat simplified and improved form is accomplished by a modification to the recorder in which the chart drive motor 15 and sprocket roll 14 are moved to the lower part of the housing with the sprocket roll placed in the position presently shown for the take up roll 18. When this has been done the sprocket roll will positively pull the chart from the supply roll 12 and force it out of the slot provided in the bottom of the case, thus eliminating the need for take up roll 18 and the slippage belt that normally is connected to the sprocket roll and take up roll. This results in an arrangement whereby the chart is "pushed" through the bottom of the casing in such a way that it can hang free or wind itself up for a short length in a box which the user might place beneath the recorder housing.

Although not illustrated in the drawings of the present invention, the particular chart marking system used readily lends itself to circular charts (single or multi-channel) as well as strip charts.

Other obvious modifications in the structure or method of making records may be made without departing from the spirit and scope of the present invention, as defined in the appended claim.

We claim:
1. A multi-channel operation recorder comprising a chart strip of dark colored paper with an opaque light colored wax coating on its front surface on which a dark trace can be produced by local heating; a frame or bracket with a plurality of similar, independently operable, stationary, heating elements having a negative temperature coefficient; said heating elements being mounted at the back of said chart in constant contact therewith; clock means for moving said chart over said heating elements at a timed speed; a casing having a suitable window at its front face for exposing an unobstructed view of a recorded portion of said strip chart, a supply roll for supplying a continuous strip chart mounted in the back of said casing, a sprocket roll in the upper forward part of said casing driven by said clock means and a take-up roll mounted in the lower forward part of said casing, said strip chart being provided with sprocket holes and being passed from said supply roll over said sprocket roll and down over said elements, past said window to said take-up roll; electrical means for heating any one or more of said elements, to make it or them effective to produce on the front surface of said chart record traces of the contacts between the chart and the elements, and a plurality of switch means, each for controlling one of said heating elements, remotely located with respect to said recorder and in convenient positions with respect to the operation being recorded, said switch means having conductors electrically connecting them with said recorder.

2. The recorder defined in claim 1, wherein said clock means moves said chart strip at a continuous and unvarying speed, and wherein said chart strip is clearly printed with time interval markings for direct reading of the precise times of day of recorded changes in the operation being recorded.

3. An operation recorder, as defined in claim 1, having a combination of independent heating elements and chart paper of such characteristics that any of the recording channels can, at the discretion of the user, be applied to automatic operation in response to a switch installed on a machine or process; or chart coding by use of combinations of manual switches which, when operated, create numerous codes on the instrument chart.

References Cited

UNITED STATES PATENTS

| | | | |
|---|---|---|---|
| 2,433,382 | 12/1947 | Marrison | 346—74 |
| 2,922,688 | 1/1960 | Boyan | 346—76 |
| 2,992,060 | 7/1961 | Roberts | 346—76 |

FOREIGN PATENTS

| | | |
|---|---|---|
| 729,663 | 5/1955 | Great Britain. |
| 973,540 | 10/1964 | Great Britain. |

RICHARD B. WILKINSON, *Primary Examiner.*

J. W. HARTARY, *Assistant Examiner.*